May 21, 1946.  A. F. HEDBERG ET AL  2,400,755
COMPENSATING CHUCK
Filed July 5, 1943  5 Sheets-Sheet 1

Inventors:
Albert F. Hedberg &
Edward Colbert;
By Joseph O. Lange Atty.

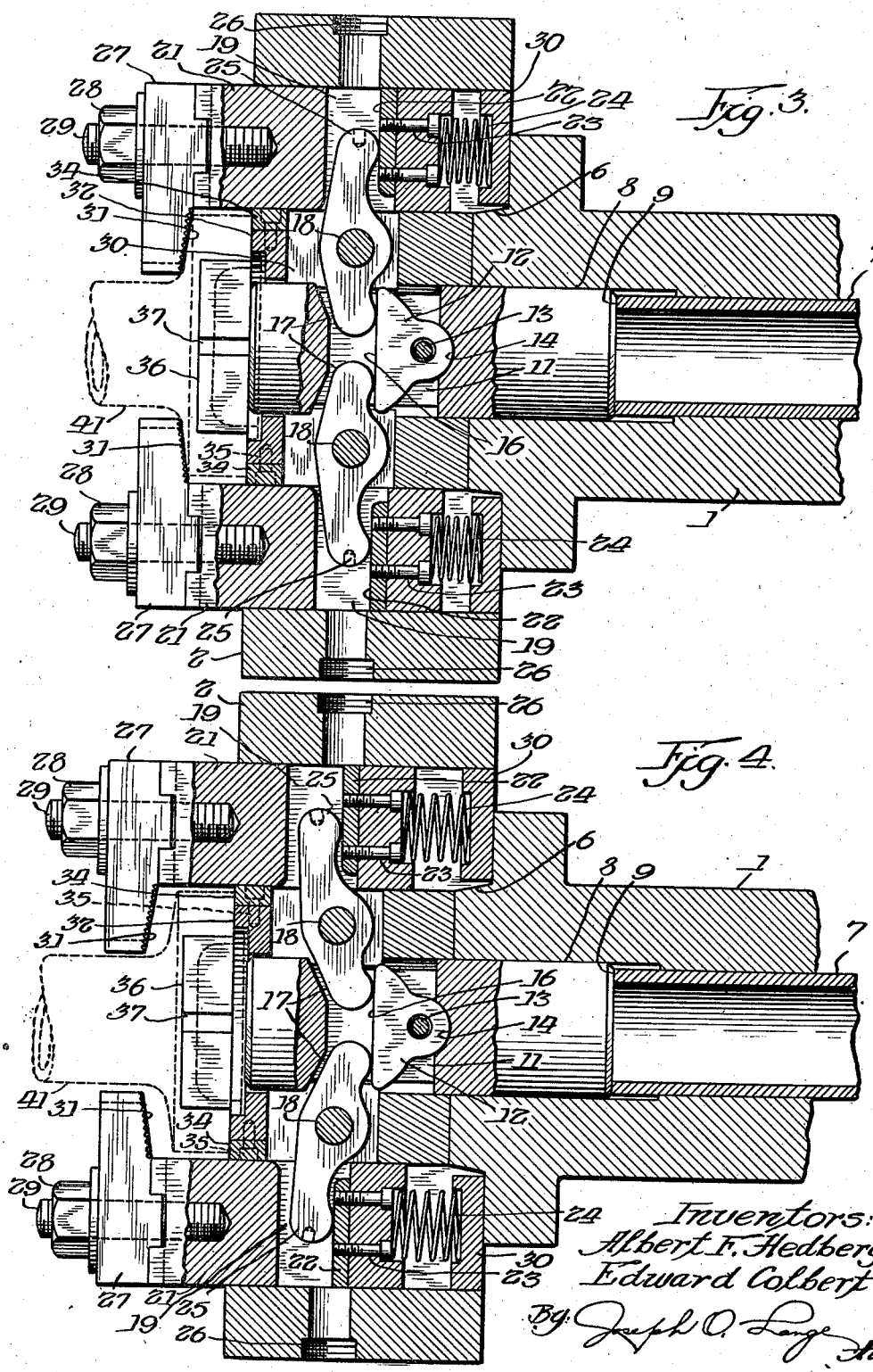

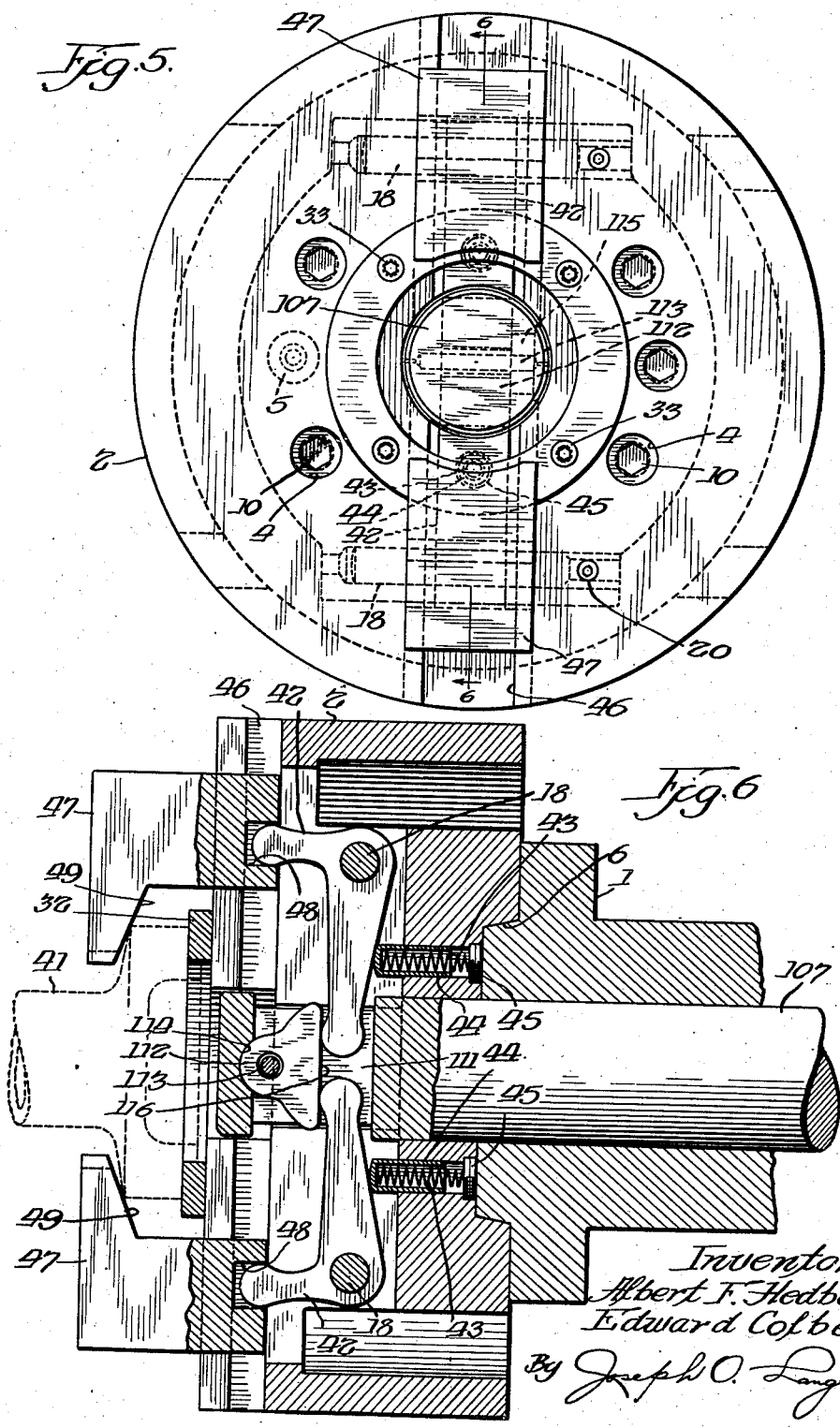

May 21, 1946.  A. F. HEDBERG ET AL  2,400,755
COMPENSATING CHUCK
Filed July 5, 1943  5 Sheets-Sheet 4
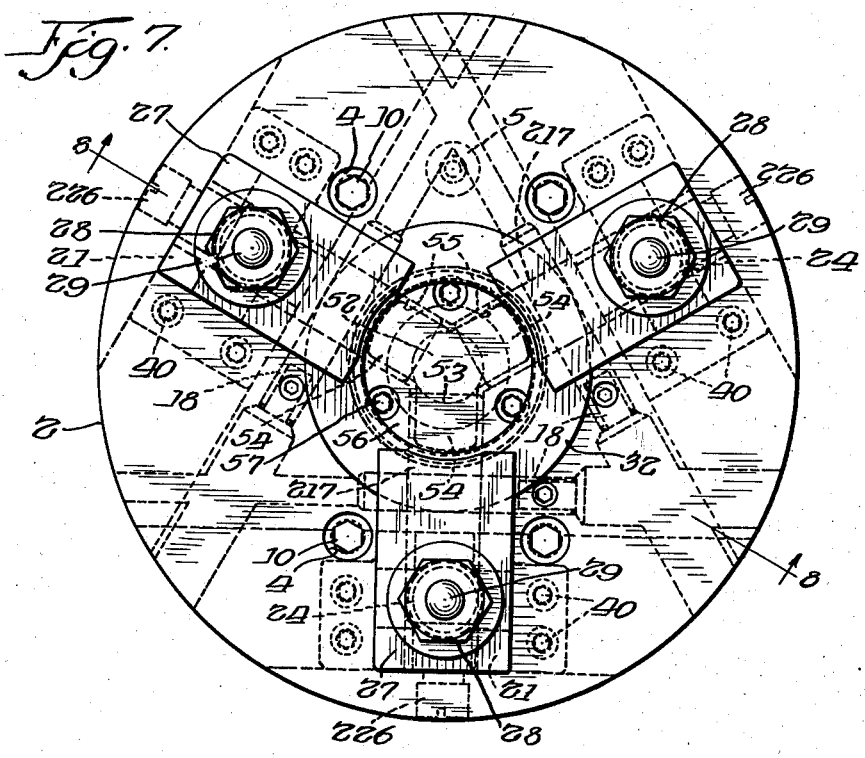
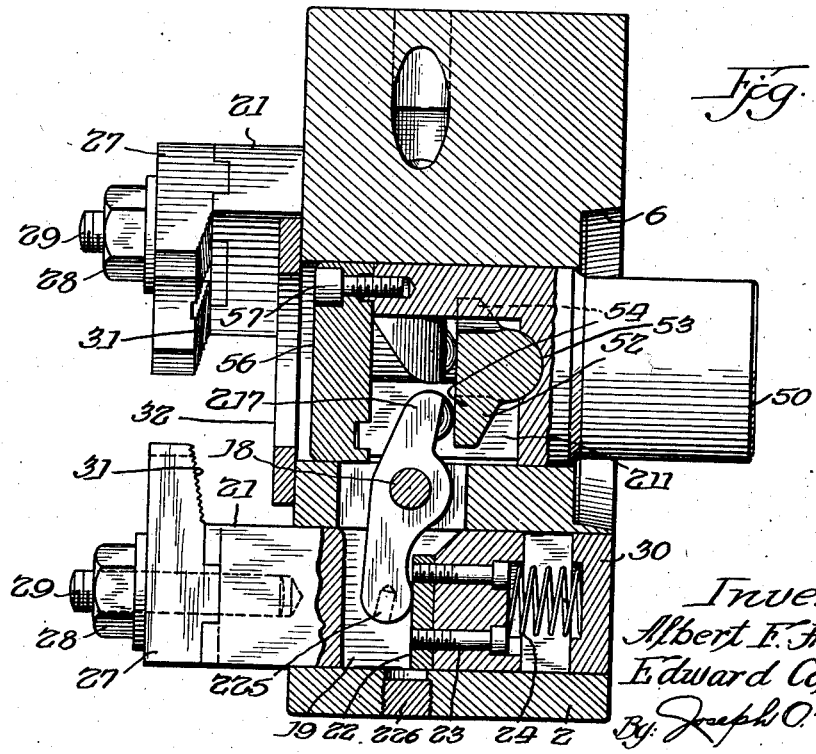
Inventors:
Albert F. Hedberg &
Edward Colbert.

Inventors:
Albert F. Hedberg, &
Edward Colbert.
By Joseph O. Lange
Atty.

Patented May 21, 1946

2,400,755

UNITED STATES PATENT OFFICE 2,400,755

COMPENSATING CHUCK

Albert F. Hedberg and Edward Colbert, Chicago, Ill., assignors to Crane Co., Chicago, Ill., a corporation of Illinois Application July 5, 1943, Serial No. 493,626

3 Claims. (Cl. 279—1)

This invention relates broadly to a compensating chuck. Its novelty and the significance of its use will be more greatly appreciated when it is understood that in the past, when necessary to grip products of unequal thicknesses or widths or both in a lathe or like machine tool, it was frequently necessary to employ several individual clamps in order to hold the product securely in position on the machine tool.

Such prior practices have necessarily been expensive, requiring considerable time for setting up the work and in many instances because of involving a plurality of jaws or clamps such chucking has not been satisfactory due to resultant inaccuracies. Accordingly, the machining of such product has necessarily been objectionably defective on numerous occasions, resulting in scrapped parts and costly time losses.

Therefore it is an important object of this invention to provide a chuck of the compensating type in which articles having unequal thicknesses or widths may be accurately and conveniently chucked in an economical manner.

More particularly, it is an important object to provide a chuck of this character in which a novel type of equalizing member in cooperation with a push- or pull-rod, as the case may be, is employed to effect simple and accurate chucking of the product to be machined or otherwise handled.

Another important object is to provide a novel form of chuck which is relatively devoid of complications in construction, employing few working parts and eliminating the objectionable wear and expensive parts replacement from time to time, heretofore present in previous chucks.

Another important object is to provide a chuck which insofar as the expense of installation is concerned involves approximately the same relative costs as prior chuck installations.

A further object is to provide a novel compensating chuck in which a plurality of jaws may be used to grip articles with varying thicknesses or diameters, permitting the use of a wide variety of jaws or gripping means.

Other and more detailed objects and advantages of the invention will become more readily apparent upon proceeding with the following description thereof read in connection with the accompanying drawings, in which Fig. 1 is an end elevation of a preferred embodiment of a two-jaw chuck constructed in accordance with our invention.

Fig. 3 is a sectional view on the line 3—3 of Fig. 1, with the novel chuck shown in the closed or gripping position.

Fig. 4 is a view of a similar section as described in connection with Fig. 3 but with the chuck shown in the open or non-gripping position.

Fig. 5 is an end elevation of a modified form of two-jaw chuck.

Fig. 6 is a sectional view taken on the line 6—6 of Fig. 5.

Fig. 7 is an end elevation of a further modified form of chuck employing a three-jaw arrangement embodying our invention.

Fig. 8 is a sectional view taken along the line 8—8 of Fig. 7.

Similar reference characters refer to similar parts throughout the several views hereinafter described.

At the outset, it should be understood that the hereindescribed chucks are provided with the conventional connecting means for attachment to the usual lathes or other machine tools such as those made by well known manufacturers, since the machine spindle with which the chuck of this invention cooperates is universally applicable to conventional machine tools.

Thus the detailed manner in which the machine push-rod or pull-rod hereinafter identified with greater particularity is actuated in order to provide the desired reciprocal motion thereto is immaterial and is merely a matter of choice of the individual machine-tool manufacturer. The description of the detailed method of operation of the push- or pull-rod has therefore been intentionally omitted from this specification. Sometimes its reciprocal movement has been accomplished by means of a power driven element or else more frequently by the usual manual means, thus moving the rod axially relative to the stationary machine spindle in a number of conventional methods. However, it should be understood that the subsequent effect of such reciprocal motion of the push- or pull-rod upon the operation of our novel chuck is the gist of this invention.

Figure 1:
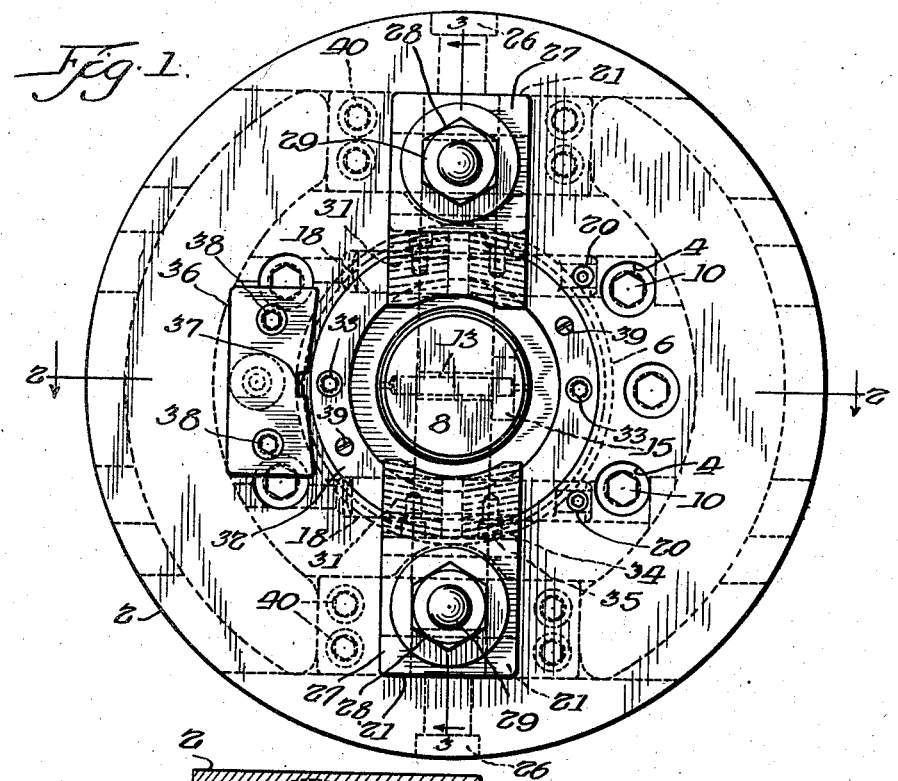
Figure 2:
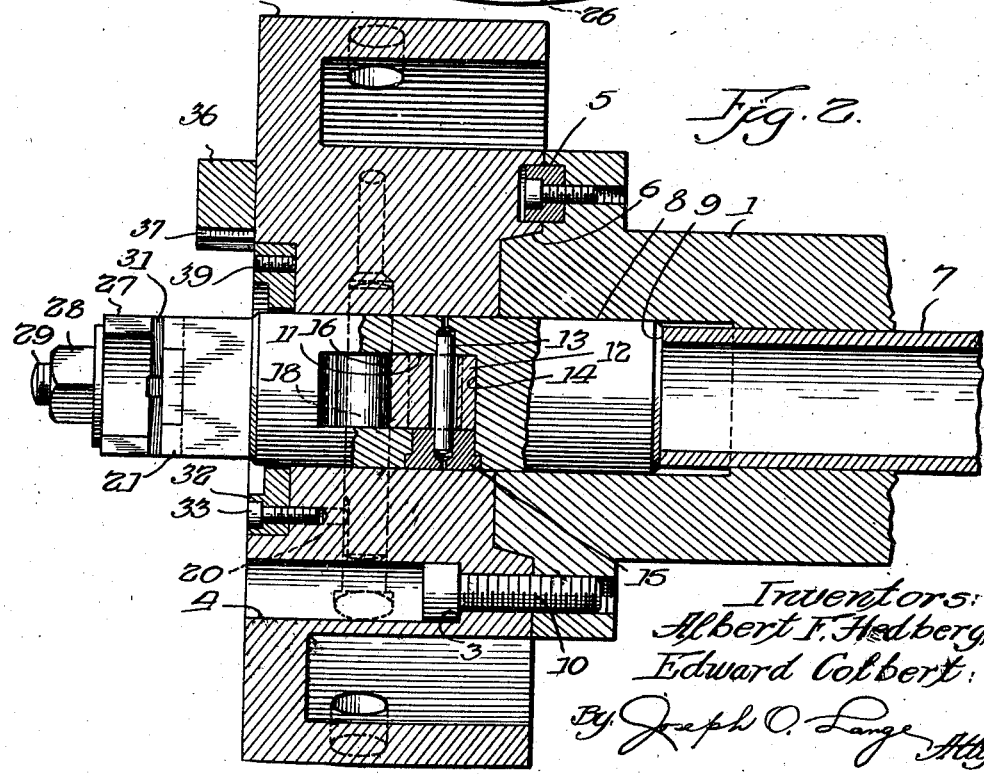
Fig. 2 is a sectional view taken on the line 2—2 of Fig. 1.
Figure 9:
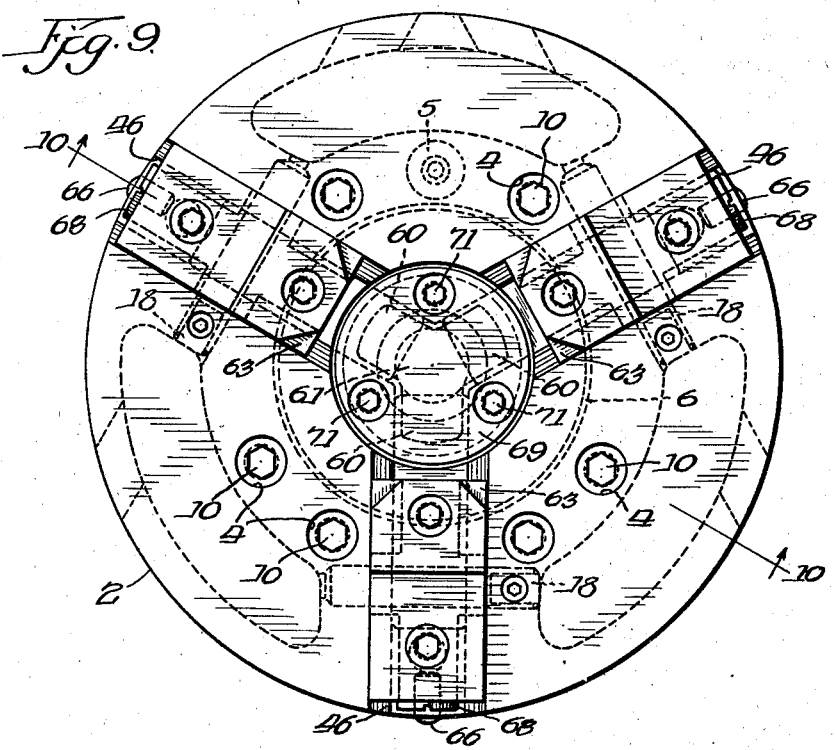
Fig. 9 is a further modified form of three-jaw chuck based upon our invention.

Proceeding now with the description and referring particularly to Fig. 2, the hollow driving spindle 1 is generally attached to the chuck body 2 by means of the annularly arranged cap screws 10 shouldering as at 3 within the hollow portion or recess 4, the accurate positioning of such latter body being determined by means of the combined lug and Allen-head screw 5. The chuck body is preferably centered upon the spindle by means of the conventional tapered or frusto-conical surface 6. Since the spindle is hollow or tubular, it allows for the reciprocal movement of the push-rod 7, operated by any convenient motion, as previously referred to, to effect such desired movement. The push-rod 7 is positioned in abutting relation to the chuck push-rod 8 contacting at the surface 9. The chuck push-rod 8, as indicated, is recessed so that within the chamber 11 the pivotally movable equalizer member 12 is positioned by means of the locating pin 13. It is significant here to note that the latter pin member is loosely mounted relative to the equalizer 12 so that, as indicated, the substantially circular contact is maintained as at 14, for reasons hereinafter referred to.

Thus as more clearly shown in Fig. 3 in which the novel chuck constituting our invention is shown in the closed or gripping position, the pin 13 is mounted as above described so that the equalizer 12 has its end or transverse bearing formed upon the circular or cylindrical section as at 14, thereby removing the usual objectionable shearing stress load from the pin. Thus the latter member merely is for locating purposes in positioning the equalizer member 12 within the chamber 11, and is easily insertable through the aperture within which the removable bushing 15 is mounted as more clearly shown in Fig. 2. Referring again to Fig. 3, in one preferred embodiment the pivotable equalizer 12 is provided with the relatively flat bearing surface 16 against which an inner end portion of the pivotally mounted clamping lever 17 bears, the latter member being located and mounted by means of the clamping pin 18, the latter being journally mounted as illustrated within the chuck body. The opposite end 25 of each pawl or clamping lever 17 extends within respective chambers 19 of each of the axially movable master jaw supports 21. Similarly, this latter end portion of the clamping levers 17 bears against the wear surface plates 22 preferably of hardened material, the latter plates being attached to the master jaw support 21 by means of the machine screws 23. Obviously, if desired, the entire jaw supporting member 21 may be suitably hardened to thereby dispense with the need for separate wear plates. The reciprocably movable jaw support 21 is preferably mounted in spring-loaded relation to the chuck body 2 by means of the coiled spring members 24 at the lower portion thereof, bearing against the shouldered spring washers 30 as indicated. The latter members are attached to the chuck body 2 by means of the screws 40. It will thus be apparent that the clamping levers 17 aided by the springs 24 provide for the wear blocks 22 of the jaw supports 21 and the flat bearing surface 16 of the equalizer 12 being in constant contact. The clamping levers 17 are carefully guided into position upon their respective pins 18 preferably by the use of a threaded rod applied to the end 25 through the tapped opening 26 which, after the guide rods (not shown) are withdrawn, may be suitably plugged, as hereinafter referred to in connection with the other views. The pins 18 are held in fixed non-rotatable position by means of the locking screws 20.

Firmly mounted in fixed position upon end portions of the master jaw support 21 are the diametrically opposite master jaws 27 (the form of which may vary depending upon the kind of work being machined), and retained, as indicated, by means of the nut 28 and the stud 29 for attachment to the master jaw support 21. Preferably for gripping purposes, in order to prevent slippage, the underside of the jaws 27 is provided with the arcuately extending serrations 31, although here likewise the detailed arrangement may be changed to suit the product machining conditions encountered.

Positioned in abutting relation to the chuck body 2, the centering or locating ring plate 32 is provided, attached as more clearly shown in Fig. 2 by means of the screw 33. The centering plate 32 serves to establish more accurately the location of the product to be machined upon being initially placed between the jaws 27.

In order to prevent loose metal chips formed during the machining operation from entering the annular space which normally exists between the locating plate 32 and the inside surface of the master jaw support, the filler blocks 34 are preferably provided. The latter members are suitably attached to the locating plate by means of the screws 35. In further aiding to center the work and to prevent rotation as it is positioned between the master jaws 27, a stop block 36 is provided having a slot 37 for suitably engaging a lug portion of the product to be chucked (not shown). The latter stop block is suitably held to the chuck body 2 by means of the machine screws 38.

It should be noted in connection with the locating ring plate 32 that if it is desired to remove the same from the recess in which it is contained, this may be easily done by rotating the headless set screw 39 to move the latter inwardly against the shoulder and thus cause the ring to be thrust outwardly therefrom, as indicated more clearly in Fig. 2.

Thus in considering the operation of our novel device it will be apparent, at the outset and as more clearly shown in Fig. 3, that upon moving the machine push-rod suitably inward (toward the left) the surface 16 of the equalizer 12 will move against the inner ends of the clamping levers 17 thereby moving the outer end portions of the clamping levers 17 against the wear plates 22 to move the master jaw support 21 rearwardly, that is to the right, and compressing the spring members 24. In so doing the usual jaw clearance shown in Fig. 4 is reduced to that shown in Fig. 3 so that between the upper surface of the locating ring plate 32 and the serrated underside portion 31 of the jaws 27, the flanged pipe 41 or the like (shown in dotted lines) may now be suitably gripped therebetween. It will now become apparent that since the master jaw supports 21 are independently movable within their respective substantially rectangular sockets and since both the equalizer 12 and the clamping levers 17 are pivotally movable, suitable adjustment for such differences or variations in the flanged thickness or the diameter of the pipe being chucked will be quickly and easily adjusted. Even substantial variations in the thickness or diameter of the material inserted therebetween may be taken up. Such convenience of adjustment as referred to arises from the fact that the equalizer being tiltable within its end bearing portion at 14 allows for a novel independent longitudinal movement of each jaw support 21 in response to variations in thickness in the gripping position.

It is thus apparent that a novel form of compensating chuck has been designed in which a simple and positive action has been developed to overcome previous difficulties in chucking products of variable thicknesses. As hereinafter brought out, the detailed method of actuating the jaws may be changed somewhat but still fall within the provisions of the invention.

Referring now to the modified forms of chucks shown in Figs. 5 and 6 and referring particularly to the sectional view shown in Fig. 6, in this modified form a novel type of bell-crank lever 42 is employed. It is especially useful in those cases in which a product is to be gripped having variations in the outside diameter rather than in thickness. More specifically, the modified chuck body 2 provides for the use of a machine pull-rod 107 (as distinguished from a push-rod) in which the latter member by its longitudinal movement in cooperation with the said bell-crank lever provides for the radial transverse movement of the clamping jaws 47 as distinguished from the previous longitudinal movement of the jaws described in connection with Figs. 1 to 4 inclusive. It will thus become apparent that the inward, radial movement of the jaws provides for conveniently and securely gripping the work as hereinafter described by means of the inclined surfaces 49 employed instead of the arcuately extending serrations 31 previously referred to in connection with the other figures. In this modified form of structure the pull-rod 107 preferably, although not necessarily, is made integral with the machine pull-rod and is preferably apertured at its end central portion to provide a milled slot or intermediate chamber 111 accommodating not only the end portion of the bell-crank levers 42 but also allowing for the equalizer 112 to be mounted loosely about the centering pin 113, and with the usual rounded end bearing 114 provided within the chamber 111 of the pull-rod 107. The usual pivotal pins 18 as previously described are employed, mounted in the same manner as explained in connection with the other figures. It should be noted, however, that with relation to the bell-crank levers 42, the equalizer 12 is arranged in reverse position to that described in connection with Figs. 3 and 4.

A pair of diametrically opposite return springs 43 are enclosed within the spring casing 44 and are further suitably positioned therewithin by means of the screw plugs 45, the latter members absorbing the compression load created by the springs abutting within their casings against the rearward edge surfaces of the bell-crank levers 42, as indicated. Transversely extending across the outer end face of the chuck body 2 the radial ways 46 are provided within which the oppositely disposed jaws 47, as shown in Fig. 6, are transversely or radially movable, engagement therewith being provided by the inverted T-portion forming the underside of the jaws, as indicated. The angular end extensions of the bell-crank levers 42 engage the respective recessed portions 48 of the jaw 47, the product shown in dotted lines and designated 41 being initially positioned in abutting relation upon the locating plate 32. The latter member is attached to the chuck body 2 by means of the usual screws 33 as shown more clearly in Fig. 5. Thus it will become apparent that as the pull-rod 107 is drawn toward the right the bell-crank levers 42 will be pivotally moved on their pins 18, which movement will cause the equalizer 112 to be tilted upon its pin 113, moving within the end bearing 114 formed in the cap end 115. The bell-crank levers contact the flat bearing surface 116 of the equalizer. Thus the jaws 47 are drawn inwardly toward the central axis of the chuck, and thereby move the jaws 47 also inwardly upon their inclined surfaces 48 to grip the peripheral portion of the product shown. It will therefore be apparent that the pivoting equalizer 112 will permit the bell-crank levers to be moved pivotally independently, such independent movement being governed by the varying thickness or lack of uniformity in thickness of material being gripped. Upon releasing the pull-rod 107 and permitting it to be moved toward the right, the return springs 43 will move the angular portion of the bell-crank levers 42 outwardly at the location in which they engage the recess 48 to permit the easy removal of the work. While in these figures the stop block 36 of the other figures is not shown it is obvious that this detail might likewise be employed without departing from the scope of the invention.

Thus far in connection with the description of our invention relative to the longitudinally movable jaws as well as to the transversely movable jaws, a compensating chuck has been described in which only a single pair of oppositely disposed jaws has been used. As will hereinafter be disclosed, more than two jaws may also be used by a unique placing arrangement of the jaws as well as in employing a novel type of equalizer to permit a high degree of flexibility for handling variations in thickness or diameter of product to be gripped and similar to that featured in connection with the two-jaw arrangement previously described.

With the foregoing type of construction in mind, attention is now directed to the modified form of compensating chuck employing three jaws shown in connection with Figs. 7 and 8. Viewing specifically Fig. 8, the conventional push-rod 50 similar to that previously described is used being reciprocably movable within the chuck body 2. However, since three jaws will be used the equalizer 52 used in the instant modification differs fundamentally from the previous type of equalizer used in that its bearing portion, as indicated at 53, is of spherical rather than cylindrical form. In addition, as shown more clearly in Fig. 7, the bearing surface at the upper portion of the equalizer is provided with three radially spaced arms as shown at 54. Thus this type of equalizer avoids the use of the pin 13 previously employed and described in connection with the other figures. Instead it simply relies upon the greater flexibility provided in the spherical bearing 53 of the equalizer in responding to the motion of the three jaws. Otherwise the general relation and types of elements used in making up the completed assembly is similar to that described in connection with Figs. 1 to 4 inclusive. It will be apparent that as the push-rod is moved longitudinally away from the chuck body 2 the jaw supports 21 will be likewise actuated longitudinally. For such variations in thickness as may be found in the article being chucked the inclination of the spherically based equalizer 52 from the horizontal axis of the chuck will vary accordingly.

The clamping lever 217 has its inner end projecting within the chamber 211 and bears against the top surface of the equalizer as shown, the removable screw plugs 226 being insertable within the aperture after adjustably positioning the lever upon its pin 18 from the end 225.

The end of the push-rod 50 is preferably provided with the cap member 56 suitably attached by the screws 57 to the push-rod 50. Thus as the push-rod 50 is moved to the left the jaw supports 21 will be moved to the right and thereby clamp the jaws 27 against the article to be gripped (not shown) and against the compression of the springs 24. Each jaw will grip in accordance with the travel permitted by the jaw support in light of the variations in thickness encountered.

Figure 10:
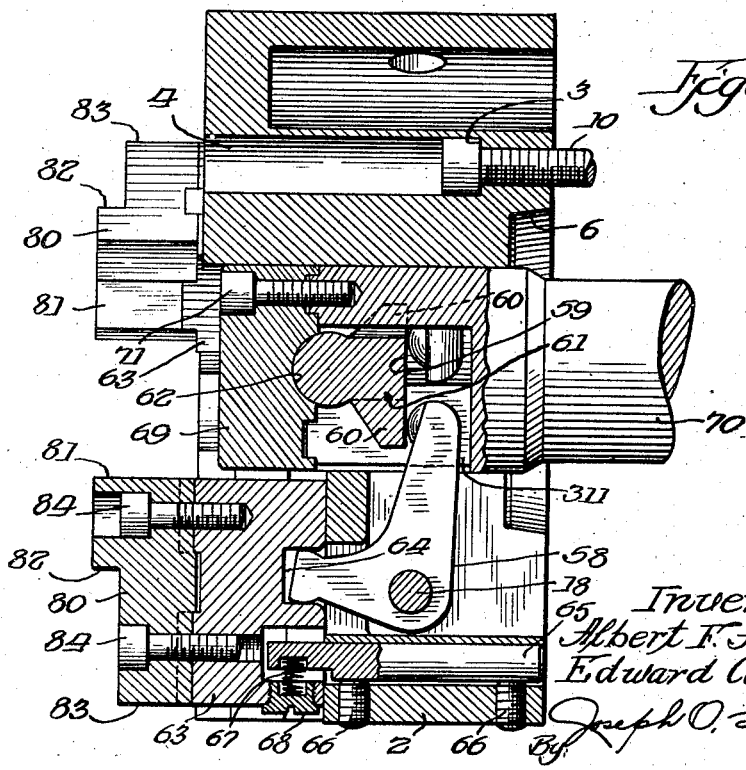
Fig. 10 is a sectional view taken on the line 10—10 of Fig. 9.

A further modified three-jaw compensating chuck is useful for installations in which gripping of an article of variable diameter is necessary. It may be applied on a similar type of machine but the gripping jaws are arranged to move radially transversely rather than longitudinally in response to reciprocal movement of the push-rod similar to that described in connection with Figs. 5 and 6. In this modified form of construction, and referring to Fig. 10, the pull-rod 70 is of the usual construction with the central chambered portion 311 within which an end of the bell-crank levers 58 is positioned, the latter members being pivotally mounted by means of the usual pin 18, the end portion of the bell-crank levers 58 bearing, as indicated, against the flat surface 59 of the equalizer 61 having a spherical end bearing 62 and with the three radially extending fingers 60. The equalizer 61, as in connection with the construction described in Fig. 7, is provided with an end bearing 62 of spherical form in the cap member 69 to enable the equalizer to be responsive universally or in a plurality of directions on the urge of the independently mounted bell-crank levers 58. Similarly, the jaw supports 63 are transversely or radially movable and are provided with the recess 64 engaged by an end portion of the bell-crank levers 58 as shown. In this modified form, the jaw support is spring loaded so as to assist in conveniently releasing the gripped article when the chuck is opened. In the latter connection, by means of the spring plug 65 fixedly positioned by the headless set screws 66, the spring 67 is held under compression by the retaining plug 68. The jaws 80 are attached to the jaw supports 63 by means of the screws 84, similar to the arrangement described in connection with Fig. 6. The jaws are provided with the inner face 81, the shouldered annular face 82 and the outer annular surface 83, which, since the jaws are reversible, may be used in gripping product in the opposite order named for the respective surfaces if desired. The combined jaw supports and jaws also move within the grooves or slots 46 in a manner similar to that described in connection with Fig. 6. The end of the push-rod 70 is provided with a cap 69 attached by means of conventional cap screws as indicated at 71.

It will be apparent that in this construction upon the recession of the push-rod 70 in a direction away from the jaws the pivotally mounted bell-crank levers 58 are moved inwardly and thus effect the means to grip the article to be machined in the general manner described in connection with the other figures. It is further clear that any variation in the diameters of the article may easily be taken care of by the tiltability of the spherically based equalizer 61 in response to the respective movement of the pivotable bell-crank levers movable with the slidable jaw supports 63.

It should be evident too from the foregoing description of the several modifications illustrated that our invention is capable of assuming a variety of forms without departure from the true spirit of the invention.

We desire, therefore, to be limited only to the extent described by the appended claims interpreted in light of the prior art.

We claim:

1. In a compensating chuck comprising an apertured body, a push-rod having a shoulder formed therein and longitudinally movable relative to and mounted within a portion of the said body, an equalizer element having a flat bearing surface and pivotally movable within said push-rod, jaw supports in the body, clamping levers pivotably mounted in said body, resilient means cooperating with end portions of the clamping levers for selectively contacting said levers with the flat bearing surface portion of the said equalizer element or the shoulder within the push-rod, and opposite end portions of the said clamping levers engaging portions of the said jaw supports, whereby upon predetermined movement of the said push-rod the said jaw supports are moved to provide for gripping an article to be chucked.

2. In a chucking means comprising a body, a push-rod therefor having a spherical recess and reciprocably movable relative to the said body, jaw supports mounted upon said body and relatively movable thereto, an equalizing member having a flat bearing surface and an end portion of spherical form for pivotal mounting within the spherical recess provided in said push-rod, and angularly extending levers having their ends engaging the flat bearing surface of said equalizing member and said transversely movable jaw supports.

3. In a compensating chuck of the character described comprising a body, a reciprocably movable push-rod having a spherical recess and reciprocably mounted within said body, an equalizer member, jaw supports having spaced shoulders and transversely movable relative to the said body, levers pivotally mounted within said body and having their inner ends in sliding engagement with said equalizer member and their outer ends disposed between the spaced shoulders of the said jaw supports, the said equalizer member having an end spherical portion adapted to pivotally bear for universal movement against a wall portion of the spherical recess within the said push-rod.

ALBERT F. HEDBERG.
EDWARD COLBERT.